United States Patent Office 3,207,731
Patented Sept. 21, 1965

3,207,731
SELF-EXTINGUISHING ALKENYL AROMATIC POLYMERIC COMPOSITIONS CONTAINING POLYBROMOPHENYL ACRYLATES AND DI-BROMOCYCLOPROPYL STYRENES
William F. Tousignant, Midland, Mich., assignor to The Dow Chemical Company, Midland, Mich., a corporation of Delaware
No Drawing. Filed Nov. 2, 1961, Ser. No. 149,524
5 Claims. (Cl. 260—80.5)

This invention relates to flame retardant plastic compositions of flammable alkenyl aromatic resins. More particularly it relates to such compositions that are copolymers of the said alkenyl aromatic resins and certain halogen containing monomeric materials.

By an "alkenyl aromatic resin" is meant a solid polymer of one or more polymerizable alkenyl aromatic compounds. Such polymer comprises in chemically combined form at least 50 percent by weight of at least one alkenyl aromatic compound having the general formula:

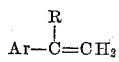

wherein Ar represents an aromatic hydrocarbon radical, or an aromatic halohydrocarbon radical of the benzene series, and R is hydrogen or the methyl radical. Examples of such alkenyl aromatic resins are the solid homopolymers of styrene, alpha-methyl styrene, vinyltoluene, ar-ethylstyrene, vinylxylene, ar-chlorostyrene, ar-isopropylstyrene or ar-tert.-butylstyrene; the solid copolymers of two or more of such alkenyl aromatic compounds with one another; and solid copolymers of one or more of such alkenyl aromatic compounds with minor amounts of other readily polymerizable olefinic compounds such as methyl methacrylate or acrylonitrile.

As used herein, the expressions "non-flammable," "flame-proof" and "self extinguishing" mean incapable of sustaining a flame until completely burned after a composition has been ignited in an open flame and then removed therefrom. The terms "self-extinguishing, class I" and "self-extinguishing, class II" have the meaning given them in the Underwriters' Laboratories Burning Test of Plastics, Subject 94, the differentiation between them being that class I materials do not give rise to flaming particles or droplets during the burning test, whereas class II materials, while self-extinguishing, do give rise to such flaming particles or droplets.

It is known that the halogen content of halogenated organic compounds, particularly of organic bromine derivatives, generally is effective to reduce the flammability of the compound itself and of flammable organic materials intimately admixed therewith. Accordingly, certain bromine containing organic compounds have been employed to render non-flammable a variety of resinous compositions. They have been used either as an intimately admixed additive for the resinous component of the non-flammable composition or as a material copolymerizable with monomers such as styrene in the preparation of the resin.

Generally, however, the use of these materials is attended by certain difficulties. Frequently, the amount required to lend self-extinguishing properties to a given resinous composition is inordinately large and the use of the material is not economically feasible. Furthermore, the amount of a given halogenated compound required may be such that the physical properties of the resinous composition may be seriously and adversely affected. Finally, the resinous compositions incorporating these materials in an amount such that the physical properties of the compositions are reasonably maintained are ordinarily classifiable only as self-extinguishing, class II and are, therefore, unacceptable for a variety of applications.

As an example of the type of halogenated compounds that are reasonably effective as agents to provide self-extinguishing properties to a copolymeric compound, compounds of the following general formula may be cited,

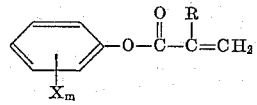

wherein R is hydrogen or the methyl radical, X is chlorine or bromine and m is an integer of a value of from 1 to 5 inclusive. Such compounds are readily prepared and may have a relatively large halogen content. They are copolymerizable with a wide variety of materials including the polymerizable alkenyl aromatic compounds.

A representative compound of high halogen content of the above type is 2,4,6-tribromophenyl acrylate. When this compound is copolymerized with styrene, for example, in an amount equal to about 14 percent by weight of the copolymerizable mixture, the resinous product is self-extinguishing. However, the product cannot be classified as a self-extinguishing, class I, composition. Nor can it be raised to that classification by an increase in the amount of the 2,4,6-tribromophenyl acrylate employed; copolymers of this material and styrene remain class II products no matter what relative amounts of the monomers are employed in their preparations.

It has now been discovered that self-extinguishing, class II, compositions comprising alkenyl aromatic resins containing flame retardant agents of the above type can be upgraded to a class I category by the addition thereto of small amounts of certain adjunctive, halogen containing flame retardant agents which are themselves incapable of acting alone to give class I compositions. Specifically, it has been discovered that copolymers of alkenyl aromatic monomers and compounds of the type (A)

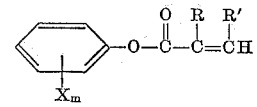

wherein X is chlorine or bromine, m is an integer of from 1 to 5 inclusive, R is hydrogen or the methyl radical and R' is hydrogen, the methyl radical or the group

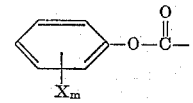

wherein X and m are as above defined, may be upgraded to class I materials by the inclusion in the mixture of co-monomers, a small amount of a halogenated cyclopropyl-styrene of the general formula:

(B)

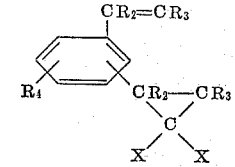

wherein X may be chlorine or bromine, $R_2$ and $R_3$ may be hydrogen or a lower alkyl radical and $R_4$ may be hydrogen, a lower alkyl radical, chlorine or bromine. For convenience hereinafter, compounds corresponding to A above are referred to as major self-extinguishing agents or fire retardant agents, while those corresponding to B are equivalently referred to as minor agents.

In general, the major fire retardant agent will constitute from about 6 to about 20 percent of the total composition. Advantageously, it will be employed in an amount sufficient so that if the minor fire retardant agent were not present the combination of chemically combined alkenyl aromatic compound and major fire retardant agent would be self-extinguishing in the class II category.

The minor fire retardant agent is employed in a considerably smaller amount relative to the major fire retardant agent. Usually, it will be present in an amount equal to from about 0.15 to about 2.0 percent by weight of the total composition.

The (2,2-dihalocyclopropyl)styrenes that constitute the minor self-extinguishing agent may readily be prepared by the method disclosed in application Serial No. 59,173, filed September 29, 1960, by William F. Tousignant, now United States Patent No. 3,044,999. As shown therein, these desired compounds are prepared by the reaction, at a temperature of from about $-10°$ C. to about $50°$ C., of approximately equimolecular proportions of an alkali metal alkoxide, a divinylbenzene and a trihalomethane.

The major self-extinguishing agents of the invention are conveniently prepared, in known manner, by the esterification of the desired polyhalogenated phenol with the acid chloride of the desired unsaturated acid, as disclosed in application Serial No. 142,501 and application Serial No. 142,502, filed October 3, 1961, by William F. Tousignant, now abandoned.

The resinous compositions contemplated by the present invention may be prepared by any of the conventional techniques employed, for example, in the preparation of polystyrene. The mixture in desired proportion of the alkenyl aromatic monomer and the major and minor self-extinguishing monomers may thus be polymerized in mass, in aqueous suspension or in the form of an emulsion. Similarly, the post polymerization treatment and handling of the compositions are conventional.

Inasmuch as both the major and minor self-extinguishing agents are chemically combined in the resinous composition they show no tendency to migrate to the surface of the composition and cannot be leached therefrom. As a result, the compositions retain their enhanced self-extinguishing characteristics indefinitely.

The self-extinguishing resinous compositions are readily fabricated into useful articles by the conventionally employed methods of compression molding, extrusion, injection molding and the like. They are possessed of good thermal stability and suffer little discoloration under the conditions of temperature obtaining in the practice of these fabrication techniques.

It may be particularly noted that the resinous compositions of the present invention exhibit their excellent self-extinguishing characteristics in the form of cellular articles equally as well as in a solid form. Thus, cellular objects of these compositions are also excellently self-extinguishing.

Cellular articles of the present compositions may be prepared by any of the known ways of preparing objects of cellular polystyrene. For example, they may be employed in the method of U.S. Patent No. 2,669,751 wherein the composition is heat-plastified in an extruder and is mixed with a normally gaseous agent such as methyl chloride or the like under superatmospheric pressure to form a gel which is brought to a temperature between about $60°$ and $130°$ C., at which temperature it remains flowable under the conditions employed, then is extruded into the atmosphere wherein the extrudate expands to form a cellular body.

The invention is illustrated by the following non-limiting examples, wherein all parts and percentages are on a weight basis.

EXAMPLE I

Into a glass pressure bottle there was charged a mixture of 50.4 parts of styrene, 4.0 parts of 2,4,6-tribromophenyl methacrylate, 0.5 part of m-(1,1-dibromo-2-methyl-2-cyclophenyl)isopropenylbenzene and .055 part of di-tertiarybutyl peroxide. The air over the charge was displaced by nitrogen and the bottle was sealed, after which it was placed in an oil bath maintained at $110°$ C. for a period of 20 hours. The resulting polymer was ground and devolatilized at $80°$ at 1–5 mm. of mercury absolute pressure for 7 hours. The absolute viscosity of a 10 percent solution of the polymer in toluene was 146.9 at $25°$ C. Its bromine content was 4.8 percent.

The polymer was molded to give clear test bars measuring $6'' \times \frac{1}{2}'' \times \frac{1}{8}''$ as specified in the Underwriters' Laboratories Test, Subject 94, Burning Tests of Plastics. Testing according to this procedure classified the polymer as self-extinguishing, class I.

The major and minor self-extinguishing agents employed herein were prepared as follows:

2,4,6-tribromophenyl methacrylate

Into a reaction flask fitted with a condenser, stirrer and dropping funnel there was charged a mixture of 2317 parts of 2,4,6-tribromophenol, 707 parts of triethylamine and 5320 parts of methylene chloride. From the dropping funnel there was added, with stirring, 728 parts of methacryloyl chloride during 1 hour. At the conclusion of this addition, the reaction mixture was maintained at the reflux temperature of $40°$ C. for an additional 4 hours.

The reaction mixture was freed from the triethylamine hydrochloride by-product and unreacted 2,4,6-tribromophenol by thorough and successive washings with water, dilute caustic soda solution, dilute hydrochloric acid and water.

To the methylene chloride solution of reaction there was added a mixture of 2000 parts of water and 1000 parts of methanol. The methylene chloride was distilled from the mixture under a moderate vacuum at about $30°$ C. A crystalline product was obtained when removal of the methylene chloride was substantially complete. The crystalline product was filtered, washed and dried. There were obtained 2367 parts of white, crystalline, 2,4,6-tribromophenyl methacrylate, M.P. $62–63°$ C.

m(1,1-dibromo-2-methyl-2 cyclopropyl)isopropenyl benzene

Into a reaction vessel fitted with a condenser, stirrer and thermometer there were charged 600 parts of tertiary butyl alcohol which had been dried by distillation from sodium. The alcohol was heated to reflux temperature and 27.3 parts of potassium metal were added thereto during 1 hour. When all the metal had reacted, the excess alcohol was removed by distillation under vacuum. To the cooled potassium tert-butoxide there was added a mixture of 150 parts of pentane and 221 parts of m-diisopropenylbenzene. The mixture was cooled to about $-5°$ C. and stirred to form a well dispersed slurry of the potassium tert-butoxide in the above liquids. To this slurry, maintained at a temperature of $-5°$ to $3°$ C. there were added dropwise 177 parts of bromoform during 2 hours. The reaction mixture was allowed to warm to room temperature and it was stirred for an additional 18 hours. To the reaction mixture there was then added 250 parts of water containing a small amount of hydrochloric acid. The organic layer was separated from the water layer which was washed with 130 parts of pentane. The combined organic portions were dried, filtered and distilled. The product was obtained as 133 parts of a yellow oil, B.P. $113–118°$ C./0.2 mm., $n_D^{25}=1.5880$, $d_4^{25}=1.5878$.

EXAMPLE II

Following the procedure of Example I a polymer of 9.0 percent bromine content was prepared from 50.4 parts of styrene and 10.0 parts of 2,4,6-tribromophenyl methacrylate. Burning tests on specimens prepared therefrom classified the polymer as self-extinguishing, class II.

EXAMPLE III

Following the procedure of Example I, self-extinguishing, class I, compositions were prepared from monomer charges having the percentage compositions given in Table I, below.

TABLE I

| Run No. | Styrene, Weight Percent | 2,4,6-tribromophenyl Methacrylate. Weight Percent | m-(1,1-dibromo-2-methyl-2-cyclopropyl) isopropenylbenzene, Weight Percent |
|---|---|---|---|
| 1 | 90.2 | 8.9 | 0.9 |
| 2 | 88.9 | 10.6 | 0.5 |
| 3 | 82.7 | 16.9 | 0.4 |
| 4 | 83.4 | 16.4 | 0.2 |

EXAMPLE IV

According to the method of Example I, copolymers were prepared in which pentabromophenyl methacrylate replaced the 2,4,6-tribromophenyl methacrylate of that example. The composition of two class I, self-extinguishing, polymers is given in Table II below.

TABLE II

| Run No. | Styrene, Weight Percent | Pentabromophenyl Methacrylate, Weight Percent | m-(1,1-dibromo-2-methyl-2-cyclopropyl) isopropenylbenzene, Weight Percent |
|---|---|---|---|
| 5 | 92.3 | 7.3 | 0.4 |
| 6 | 91.8 | 7.3 | 0.9 |

The major self-extinguishing agent employed herein was prepared as follows.

*Pentabromophenyl methacrylate*

Into a reaction flask equipped with a condenser, stirrer and dropping funnel there was charged a mixture of 514 parts of sodium pentabromophenate and 1600 parts of benzene. This mixture was heated to the reflux temperature. From the dropping funnel there were added with stirring, 117.5 parts of methacryloyl chloride during 4 hours. Stirring and heating were continued for an additional 2 hours after which the reaction mixture was filtered. Then benzene solution of reaction product was washed three times with 1000 parts of water. The benzene was permitted to evaporate. The resulting crystalline material was recrystallized from a solution containing equal volumes of methanol and water. There were obtained 406 parts of white, crystalline pentabromophenyl methacrylate, M.P. 157°–160° C.

EXAMPLE V

According to the method of Example I, copolymers were prepared in which m-(1,1-dibromo-2-cyclopropyl) vinyl benzene replaced the m-(1,1-dibromo-2-cyclopro-ply)isopropenyl benzene of that example. The composition of several class I, self-extinguishing, polymers is given in Table III below.

TABLE III

| Run No. | Styrene, Weight Percent | 2,4,6-tribromophenyl Methacrylate, Weight Percent | m-(1,1-dibromo-2-cyclopropyl)vinyl benzene, Weight Percent |
|---|---|---|---|
| 7 | 85.5 | 13.6 | 0.86 |
| 8 | 82.7 | 16.5 | 0.82 |
| 9 | 80.0 | 19.3 | 0.79 |
| 10 | 86.3 | 13.6 | 0.13 |

The minor self-extinguishing agent employed herein was prepared as follows:

*m-(1,1-dibromo-2-cyclopropyl)vinylbenzene*

According to the method given in Example I, m-(1,1-dibromo-2-cyclopropyl)vinylbenzene was prepared by the substitution of 195 parts of m-divinylbenzene for the m-diisopropenyl benzene of that example. The product was obtained as a yellowish oil, B.P. 99° C./0.2 mm.

What is claimed is:

1. A non-flammable thermoplastic polymeric composition comprising in chemically combined form (1) at least 50 percent by weight of at least one alkenyl aromatic compound having the general formula

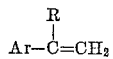

wherein Ar represents an aromatic radical of the group consisting of hydrocarbon and halohydrocarbon radicals of the benzene series and R represents a member of the group consisting of hydrogen and the methyl radical, (2) from about 6 to about 20 percent by weight of a compound of the general formula

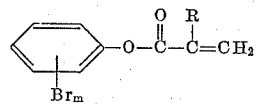

wherein $m$ is integer from 3 to 5, and R is a member of the group consisting of hydrogen and the methyl radical, and (3) from about 0.15 to about 2.0 percent by weight of a compound of the general formula

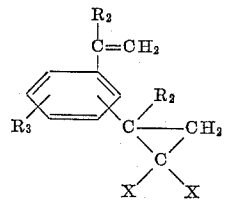

wherein X is bromine, $R_2$ is a member of the group consisting of hydrogen and the methyl radical, and $R_3$ is a member of the group consisting of hydrogen, bromine, chlorine and a lower alkyl radical.

2. A non-flammable thermoplastic polymeric composition comprising in chemically combined form (1) at least 50 percent by weight of at least one alkenyl aromatic compound having the general formula

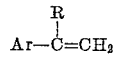

wherein Ar represents an aromatic radical of the group consisting of hydrocarbon and halohydrocarbon radicals of the benzene series and R represents a member of the group consisting of hydrogen and the methyl radical, (2) from about 6 to about 20 percent by weight of a methacrylic acid ester of the general formula

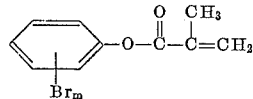

wherein $m$ is an integer from 1 to 5, and (3) from about 0.15 to 2.0 percent by weight of a compound of the general formula

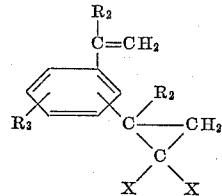

wherein X is bromine, $R_2$ is a member of the group consisting of hydrogen and the methyl radical, and $R_3$ is a member of the group consisting of hydrogen, bromine, chlorine and a lower alkyl radical.

3. A non-flammable thermoplastic polymeric composition comprising in chemically combined form (1) at least 50 percent by weight of at least one alkenyl aromatic compound having the general formula

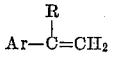

wherein Ar represents an aromatic radical of the group consisting of hydrocarbon and halohydrocarbon radicals of the benzene series and R represents a member of the group consisting of hydrogen and the methyl radical and (2) from about 6 to about 20 percent by weight of 2,4,6-tribromophenyl methacrylate, and (3) from about 0.15 to about 2.0 percent by weight of a compound of the general formula

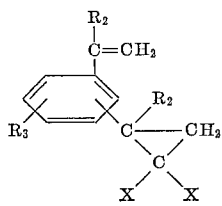

wherein X is bromine, $R_2$ is a member of the group consisting of hydrogen and the methyl radical, and $R_3$ is a member of the group consisting of hydrogen, bromine, chlorine and a lower alkyl radical.

4. A polymeric composition as claimed in claim 3 wherein (3) is m-(1,1-dibromo-2-methyl-2-cyclopropyl)isopropenyl benzene.

5. A polymeric composition as claimed in claim 3 wherein (3) is m-(1,1-dibromo-2-cyclopropyl)vinyl benzene.

References Cited by the Examiner

UNITED STATES PATENTS

| | | | |
|---|---|---|---|
| 2,822,378 | 2/58 | Bader | 260—479 XR |
| 3,044,999 | 7/62 | Tousignant | 260—88.1 XR |
| 3,058,929 | 10/62 | Vanderhoff et al. | 260—2.5 |

FOREIGN PATENTS

| | | |
|---|---|---|
| 558,943 | 6/58 | Canada. |
| 1,044,802 | 11/58 | Germany. |

JOSEPH L. SCHOFER, *Primary Examiner.*

JOSEPH R. LIBERMAN, *Examiner.*